US010922123B2

(12) United States Patent
Smith, IV et al.

(10) Patent No.: US 10,922,123 B2
(45) Date of Patent: Feb. 16, 2021

(54) CONTAINER MIGRATION IN COMPUTING SYSTEMS

(71) Applicant: Microsoft Technology Licensing, LLC, Redmond, WA (US)

(72) Inventors: Frederick Justus Smith, IV, Redmond, WA (US); Paul Bozzay, Redmond, WA (US); Benjamin M. Schultz, Bellevue, WA (US); Margarit Chenchev, Sammamish, WA (US); Hari R. Pulapaka, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 16/218,173

(22) Filed: Dec. 12, 2018

(65) Prior Publication Data
US 2020/0192689 A1 Jun. 18, 2020

(51) Int. Cl.
*G06F 9/455* (2018.01)
*G06F 16/178* (2019.01)

(52) U.S. Cl.
CPC ........ *G06F 9/45558* (2013.01); *G06F 16/178* (2019.01); *G06F 2009/4557* (2013.01); *G06F 2009/45562* (2013.01); *G06F 2009/45575* (2013.01)

(58) Field of Classification Search
CPC .................................................. G06F 9/45533
USPC .......................................................... 718/1
See application file for complete search history.

(56) References Cited

U.S. PATENT DOCUMENTS

| 9,122,712 | B1* | 9/2015 | Bono ..................... G06F 16/188 |
| 9,569,455 | B1* | 2/2017 | Bono ..................... G06F 3/0611 |
| 10,534,759 | B1* | 1/2020 | Manjunath ............ G06F 16/188 |
| 2012/0017213 | A1* | 1/2012 | Hunt ....................... G06F 21/53 718/100 |
| 2014/0033194 | A1* | 1/2014 | Natchadalingam ......................... G06F 9/45558 717/173 |
| 2014/0137125 | A1* | 5/2014 | Hsu ........................ G06F 9/4856 718/102 |
| 2015/0058461 | A1* | 2/2015 | Guiditta .............. H04L 41/0843 709/223 |

(Continued)

OTHER PUBLICATIONS

"International Search Report and Written Opinion Issued in PCT Application No. PCT/US2019/064342", dated Mar. 4, 2020, 13 Pages.

*Primary Examiner* — Mehran Kamran
(74) *Attorney, Agent, or Firm* — Liang IP, PLLC

(57) ABSTRACT

Techniques of migrating containerized software packages between source and destination computing devices are disclosed herein. In one embodiment, a method includes receiving, at a destination device, a request to migrate a source container currently executing on the source device to the destination device. The method also includes synchronizing a list of handles utilized by the source container on the source device between the destination device and the source device and instantiating, in the destination device, a destination container using a copy of an image, a memory snapshot, and the synchronized list of handles of the source container on the source device. Upon completion of instantiating the destination container, the destination device can transmit a remote display output of the application to be surfaced on the source device in place of the local display output generated by the source container.

20 Claims, 10 Drawing Sheets

(56) References Cited

U.S. PATENT DOCUMENTS

| | | | |
|---|---|---|---|
| 2016/0088066 A1* | 3/2016 | Thomas | H04L 43/08 709/203 |
| 2016/0110268 A1* | 4/2016 | Sekiguchi | G06F 11/1469 714/15 |
| 2016/0162320 A1* | 6/2016 | Singh | G06F 9/45558 718/1 |
| 2016/0205519 A1* | 7/2016 | Patel | H04L 67/1002 455/518 |
| 2016/0283261 A1* | 9/2016 | Nakatsu | G06F 9/45558 |
| 2016/0378563 A1* | 12/2016 | Gaurav | G06F 9/5077 718/1 |
| 2016/0378564 A1* | 12/2016 | Gaurav | G06F 9/50 718/1 |
| 2016/0378688 A1* | 12/2016 | Rozas | G06F 21/602 713/190 |
| 2017/0063722 A1* | 3/2017 | Cropper | H04L 47/823 |
| 2017/0366405 A1* | 12/2017 | Ganesan | G06F 9/45558 |
| 2017/0366606 A1* | 12/2017 | Ben-Shaul | G06F 3/064 |
| 2018/0074748 A1* | 3/2018 | Makin | H04L 67/34 |
| 2018/0189121 A1* | 7/2018 | Jobi | G06F 9/455 |
| 2018/0329757 A1* | 11/2018 | Patgar | G06F 9/5027 |
| 2019/0347127 A1* | 11/2019 | Coady | H04L 41/0806 |
| 2020/0012637 A1* | 1/2020 | Strauss | G06F 16/128 |
| 2020/0034167 A1* | 1/2020 | Parthasarathy | G06F 9/45558 |
| 2020/0117494 A1* | 4/2020 | Cortez | G06N 5/02 |

* cited by examiner

CONTAINER MIGRATION IN COMPUTING SYSTEMS

BACKGROUND

Sandboxing is a software management strategy that isolates operating systems and/or applications from computing resources of a host computer and other programs on the same host computer. For example, datacenters providing cloud computing services can include a large number of servers individually hosting one or more virtual machines, containers, or other types of virtualized components. The virtual machines and containers can be used to execute applications for tenants without giving direct access to the underlying resources of the severs. Sandboxing can thus provide a layer of security that prevents malware or harmful applications from negatively affecting a host computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though both virtual machines and containers can be used as virtualization techniques to accommodate compute, communications, or other types of computing services, these virtualization techniques can have different characteristics. For instance, virtual machines can incur a significantly more resource overhead than containers. A virtual machine typically has an operating system, a full set of files and directory structures, a unique configuration, virtual memory, and applications, all of which can amount to tens of gigabytes in size. In contrast, containers (e.g., Docker-based containers) are software packages that provide a certain amount of facilities a software application or service needs to run, such as code, runtime, tools, system libraries, etc. Containers may share resources, for example an operating system kernel, files, folders, configuration, provisioning, storage, and network. This enables efficient use of host computing resources and lowers administrative costs. Containers typically have a much lower memory and disk footprints than virtual machines (e.g. megabytes instead of gigabytes in size).

Under certain scenarios, laptops, tablets, smartphones, or other types of computing devices may benefit from flexibilities of switching between using local and remote computing resources while sandboxing. For example, a computer (e.g., a laptop) can use local computing resources when the computer is in "airplane mode," out of range of a local computer network, or otherwise without network connectivity. In another example, a computer may use remote computing resources when performing compute-intensive tasks such as compiling code or running other calculation-heavy workloads. In another example, a remote embedded device may resort to local processing when partitioned from a network, however may automatically switch to remote computing resources when network connection is reestablished. In a further example, a computer may have a low battery level and need to use remote resources to conserve power and/or maintain an online presence.

Under at least some of the foregoing scenarios, containerization can help switching between using local and remote resources by abstracting a workload from underlying hardware and/or software. While migration of virtual machines is well understood, migrating a containerized workload may be difficult. Unlike virtual machines that contain a complete operating system, containers share resources from an underlying operating system kernel. Sometimes, containers and one or more applications executing in the containers, as well as an underlying operating system may have changed over time. Such changes can be a result of applying a software patch to the operating system and/or application for fixing security or functional issues, installing an extension of the containers or the one or more applications to add functionality, or other suitable modifications. In another example, tracking various operating system handles associated with the containers and the one or more applications can also be difficult because operating systems and/or software drivers typically do not provide such functionalities.

Several embodiments of the disclosed technology are directed to implementing a synchronization engine for facilitating efficient migration of containers between source and destination computing devices. In certain embodiments, a computing device (e.g., a laptop, referred to below as "local device") can determine whether a source container hosted on the local device (referred to as "local container") is to be migrated to a destination device such as a remote server located in a datacenter. Example criteria for the determination can be based on a power level, a current status of network connectivity, a current computation load, or other suitable parameters of the local device. In other examples, the criteria can also be based on user input, device or sensor input, migration schedule, or other suitable conditions. In a further example, a resource (e.g. a printer) is not locally available, and the workload is moved to a location (e.g., the datacenter) where that resource is available. In another example, a host detects audit log tampering and evacuates a sensitive workload to a safe remote location.

Upon determining that the local container is to be migrated, the synchronization engine on the local device can be configured to transmit a migration request with suitable credentials to a cloud computing system indicating that a migration is about to occur. In response, the cloud computing system can be configured to authenticate the migration request based on the credentials and then select a remote server to instantiate a new container on the remote server (referred to as "remote container"). In certain implementations, the migration request can also contain data identifying version, build, or other suitable types of parameter of an operating system on the local device. The remote server (or a hypervisor thereon) can then instantiate a virtual machine or container having an operating system with compatible and/or the same version, build, or other types of parameter as that in the migration request. In other implementations, the remote server can be selected to have the compatible version, build, or other suitable types of parameter as that in the migration request. The remote container can then be instantiated directly on the remote server.

In certain implementations, the remote server can then be configured to instantiate the remote container using pre-distributed or shared container images. Such container images can include digital data representing a complete file system having file folders, files, applications, configuration or other suitable information of the container. The container images can be identified using versions, builds, hash values, series numbers, or other suitable identifiers. In other implementations, the remote server can receive a copy of the container image from the local device with or without requesting the local device for the copy of the container image.

In certain embodiments, a template is used to represent a container and associated configuration parameters. Example configuration parameters can include one or more parameters of memory configuration, security settings, network settings, graphics settings, device settings. In some embodiments, this template may have a pre-defined schema that is shared with computers that support container migration. This template may then be synchronized between computers either on a schedule, or as a part of container migration.

In certain embodiments, the synchronization engine of the local device can also transmit an initial memory snapshot of the local container to the cloud computing systems along with the migration request or upon authorization to migrate the local container. The initial memory snapshot can include data of memory state, memory state, shell projection handles, or other suitable information. In other embodiments, instead of receiving the initial memory snapshot from the local device, a base memory snapshot corresponding to the local container, for instance, during an initial boot of the local container, can be pre-distributed or shared with the remote server. Upon obtaining the initial memory snapshot, the remote server can then instantiate the remote container using the initial memory snapshot or applying the initial memory snapshot to an already instantiated remote container.

Subsequently, the synchronization engine of the local device can be configured to generate and transmit to the remote server, one or more differences from the initial memory snapshot of the local container using a copy-on-write, a memory partition, or other suitable techniques. In response, the remote server can update the instantiated remote container with the received differences of the memory snapshot. In certain embodiments, upon completions of instantiating the remote container, the remote server can be configured to signal the local device that a migration of the local container to the cloud computing system is ready to occur. During such memory update/sharing, the images of the operating system on both the local device and the remote server need to be the same version. Additionally, memory fix-ups may be performed because library files in the operating systems may not be loaded at the same location on the local device and the remote server.

The remote server may provide a user of the local device certain choices as to when to finalize the migration, or proceed based on other suitable conditions. During migration, the remote server may also force one or more processes executing on the local device to sleep or quiesce prior to the migration. Once migration of the local container to the remote container is completed, display output at the local device is switched from the local container to the remote container, for instance, Remote Desktop Protocol (RDP), an X Window system, or other suitable techniques.

During the migration process, handles to local operating system resources for the local container can be tracked. A "handle" generally refers to an abstract reference to a computing resource. For example, handles can be used when an application references blocks of memory or objects managed by an operating system or a database. An example handle can be an opaque identifier or a pointer that allows access to further information regarding the computing resource. In one embodiment, a handle table (or other suitable types of data structure) can be implemented on both the local device and the remote server to ensure handles of the local container are also opened on the remote server. This may be achieved by synchronizing the handle tables wholesale or on a per-handle basis. In some implementations, the handle table may also be cached. For example, new handles on the remote server may result in a cache miss and be remotely fetched from the local device and migrated only as-needed. In further embodiments, the handles can also be stored in a linked list, a tree, or other suitable types of data structure.

Several embodiments of the disclosed technology can thus facilitate efficient switching between using local resources and using remote resources migration via containerization. By tracking the memory state of a migrated container, the container can be migrated from a local device to a remote server, or vice versa, in a seamless manner. As such, users can readily switching between using local resources and using remote resources with little or no interruption. Though the migration process described above in the context of migrating the local container as a source container from the local device to the remote server, in other embodiments, the migration process may also be used to migrate the remote container as the source container from the remote server to the local device in the reverse direction.

DETAILED DESCRIPTION

Figure 1:
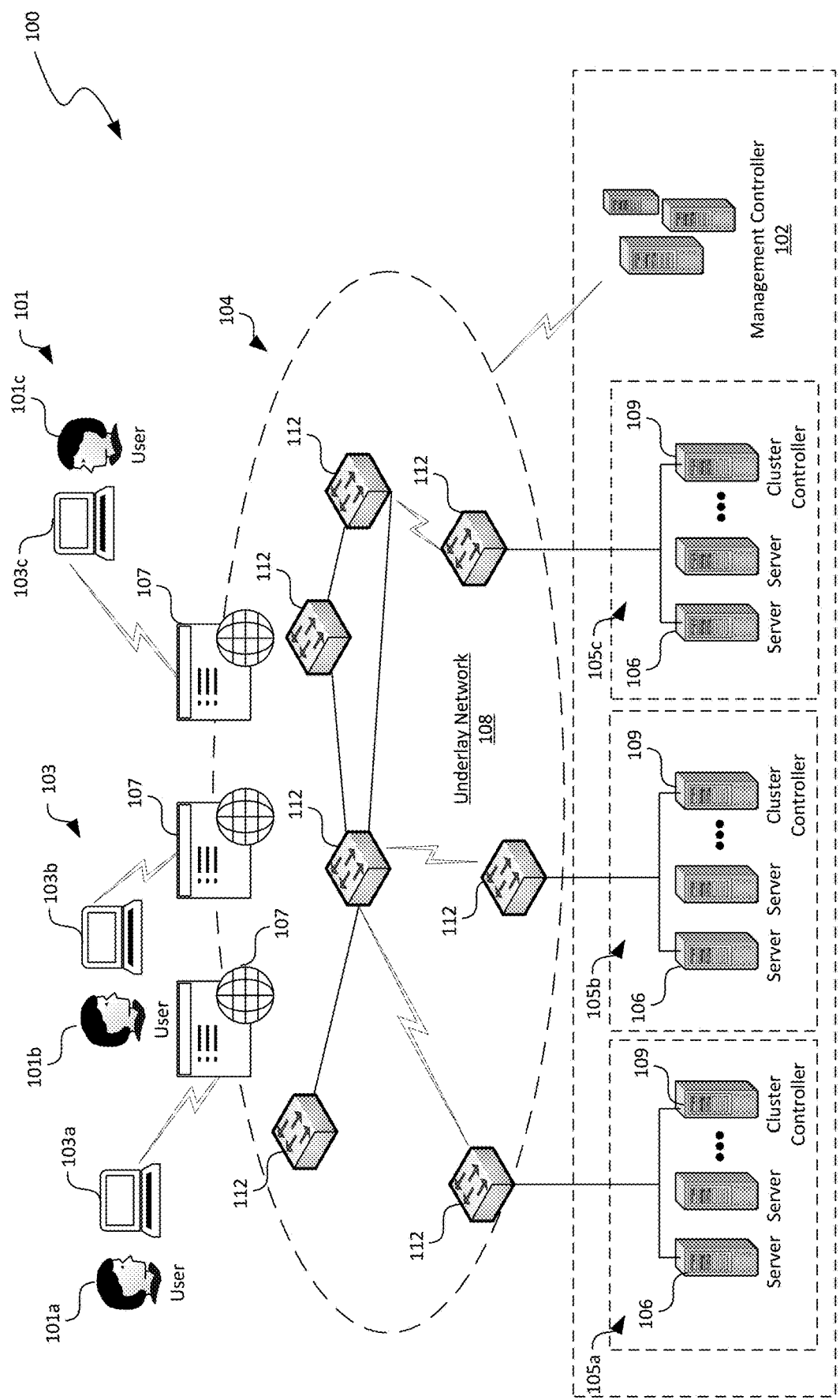
FIG. 1 is a schematic diagram of a distributed computing system with servers implementing container migration in accordance with embodiments of the disclosed technology.

Certain embodiments of systems, devices, components, modules, routines, data structures, and processes for container migration to/from datacenters or other suitable computing facilities are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term a "computing facility" generally refers to an interconnected computer network having a plurality of network nodes that connect a plurality of servers or hosts to one another or to external networks (e.g., the Internet). The term "network node" generally refers to a network device. Example network nodes include routers, switches, hubs, bridges, load balancers, security gateways, or firewalls. A "host" generally refers to a physical local device configured to implement, for instance, one or more virtual machines or other suitable virtualized components. For example, a host can include a remote server or remote device having a hypervisor configured to support one or more virtual machines, containers, or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "container" generally refers to a software package that contains a piece of software (e.g., an application) in a complete filesystem having codes (e.g., executable instructions), a runtime environment, system tools, system libraries, or other suitable components sufficient to execute the piece of software. Containers running on a single server or virtual machine can all share the same operating system kernel and can make efficient use of system memory or virtual memory. A container can have similar resource isolation and allocation benefits as virtual machines. However, a different architectural approach allows containers to be much more portable and efficient than virtual machines. For example, a virtual machine typically includes one or more applications, necessary binaries and libraries of the applications, and an entire operating system. In contrast, a container can include an application and all of its dependencies, but shares an operating system kernel with other containers on the same host. As such, containers can be more resource efficient and flexible than virtual machines. One example container is a Windows Server container by Microsoft Corporation of Redmond, Wash. Another example container is a Linux container or LXC. Docker is a popular mechanism to package and deliver containers, provided by Docker, Inc. of San Francisco, Calif.

Under certain scenarios, a container may be switched between using local and remote resources. While migration of virtual machines is well understood, migrating a container workload may be difficult. Unlike virtual machines that contain a complete operating system, containers share resources from an underlying operating system kernel. Sometimes, containers, one or more applications executing in the containers, as well as an underlying operating system may have changed over time. Such changes can be a result of applying a software patch to the operating system and/or application for fixing security or functional issues, installing an extension of the containers or the one or more applications to add functionality, or other suitable modifications. In another example, tracking various operating system handles associated with the containers and the one or more applications can also be difficult because operating systems and/or software drivers typically do not provide such functionalities. Several embodiments of the disclosed technology are directed to implementing a synchronization engine for facilitating efficiently migration of containers between local and remote computing devices, as described in more detail below with reference to FIGS. 1-8.

FIG. 1 is a schematic diagram illustrating a distributed computing system 100 implementing efficient container migration in accordance with embodiments of the disclosed technology. As shown in FIG. 1, the distributed computing system 100 can include an underlay network 108 interconnecting a plurality of local devices 103 (shown as first, second, and third local devices 103a-103c, respectively) of corresponding users 101 (shown as first, second, and third user 101a-101c, respectively), and a computing facility 104. Even though particular components are shown in FIG. 1, in other embodiments, the distributed computing system 100 can also include additional and/or different constituents. For example, the distributed computing system 100 can include network storage devices, utility infrastructures, and/or other suitable components in addition to or in lieu of those shown in FIG. 1.

The local devices 103 can each include a computing device that facilitates corresponding users 101 to access cloud services provided by the remote servers 106 via the underlay network 108. For example, in the illustrated embodiment, the local devices 103 individually include a desktop computer. In other embodiments, the local devices 103 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access suitable types of computing services provided by the remote servers 106.

As shown in FIG. 1, the underlay network 108 can include one or more physical network devices 112 that interconnect the local devices 103 and the computing facility 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The computing facility 104 can include a management controller 102 and a plurality of remote servers 106 operatively coupled to one another by the network devices 112. In certain embodiments, the remote servers 106 can individually include a physical server or a computing blade having several physical servers. In other embodiments, the remote servers 106 can also include one or more physical servers with multiple processor cores, or other suitable types of computing devices. In any of the foregoing embodiments, the remote servers 106 can individually include one or more non-volatile memories (shown as NVMs 138 in FIG. 2).

The remote servers 106 can be organized into racks, availability zones, groups, sets, computing clusters, or other suitable divisions. For example, in the illustrated embodiment of FIG. 1, the remote servers 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing facility 104 can include one, two, eight, sixteen, or any other suitable numbers of computing clusters 105 with similar or different components and/or configurations.

Each cluster 105 can also include a cluster controller 109 configured to monitor status and manage operations of the remote servers 106 in the corresponding computing cluster 105. For example, the cluster controller 109 can monitor whether a remote server 106 or components thereof has failed. In response to detecting a failure of the remote server 106 or components thereof, the cluster controller 109 can attempt to remedy the detected failure by, for instance, migrating virtual machines and/or containers hosted on the failed remote server 106 to other remote servers 106 in the same cluster 105, restarting the failed remote server 106, replacing hardware components of the failed remote server 106, and/or perform other suitable operations. Though the cluster controllers 109 are shown as separate physical servers in FIG. 1, in other embodiments, the cluster controllers 109 can also include computing services provided by one or more of the remote servers 106 in corresponding computing clusters 105.

The management controller 102 can be configured to monitor, control, or otherwise manage operations of the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more remote servers 106 in the computing clusters 105. In further embodiments, the management controller 102 can include software services hosted on one or more of the remote servers 106 in the computing clusters 105.

In operation, the users 101 can request various computing services (e.g., deployment of a site) via, for example, user portals 107 presented on corresponding local devices 103. In response, the management controller 102 can allocate one or more remote servers 106 or other computing resources (e.g., one or more remote servers 106) to execute suitable instructions to provide the requested computing services. For example, the users 101 can request, via a corresponding local device 103 to migrate a local container (not shown) currently executing on the local device 103 to one or more remote servers 106 in the computing facility 104, as described in more detail below with reference to FIGS. 3A-4B. In some embodiments, the request for computing resources may be automated by software running on local device 103, user portals 107, or other entities.

In some embodiments, the remote server 106 may be selected based on certain attributes of the remote servers 106. Example attributes can include cost, location, network latency, availability, security guarantees, government data policy, and other suitable characteristics. In some embodiments, the local container 122a running on the local device 103 may be synchronized with multiple remote servers 106 to achieve high availability, optimal location, and/or other suitable objectives.

Figure 2:
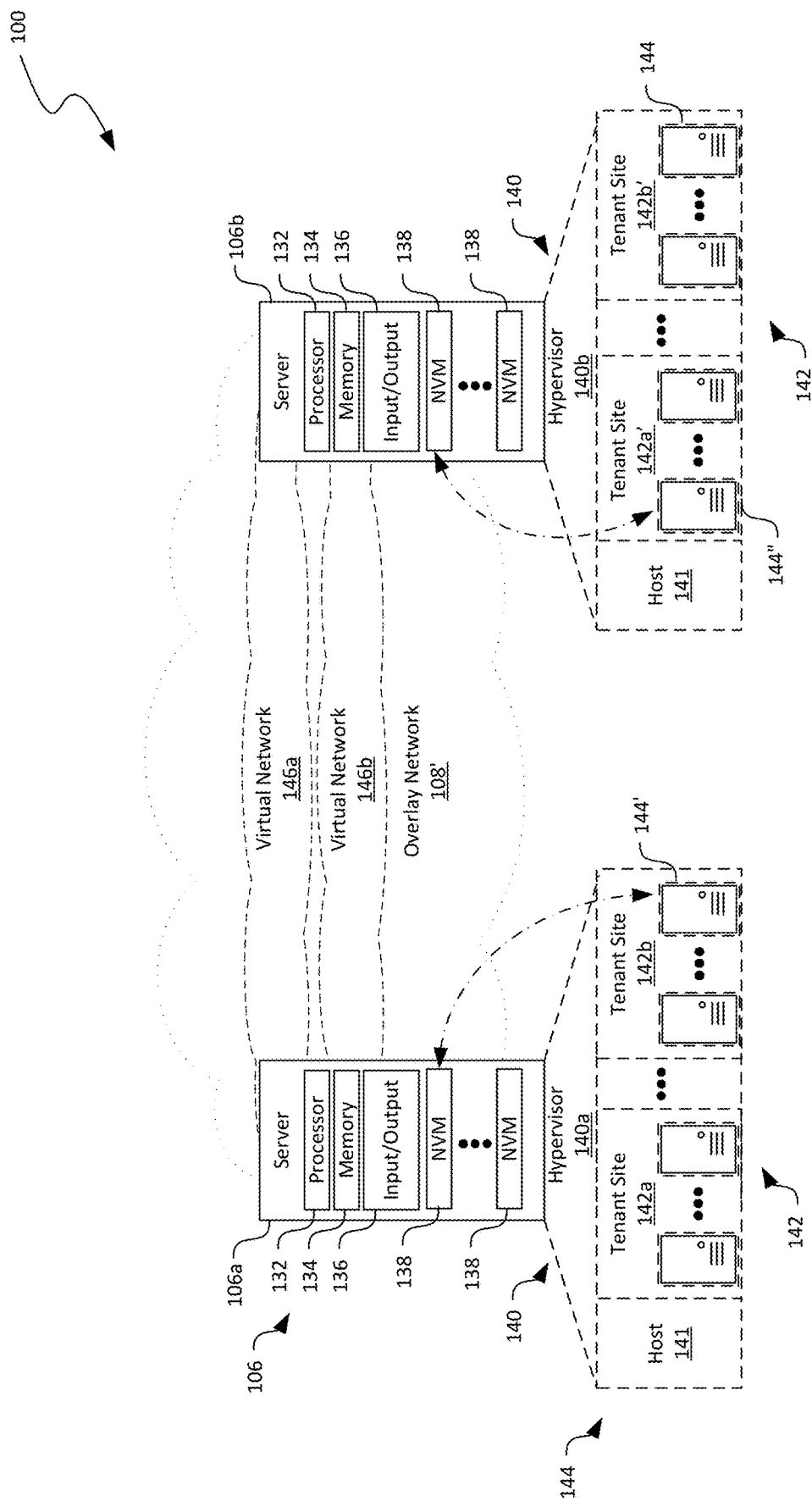
FIG. 2 is a schematic diagram illustrating certain hardware/software components of servers in the distributed computing system of FIG. 1 in accordance with embodiments of the disclosed technology.

FIG. 2 is a schematic diagram illustrating certain hardware/software components of the distributed computing system 100 of FIG. 1 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first server 106a and the second server 106b can each include a processor 132, a memory 134, an input/output component 136, and one or more non-volatile memories 138 operatively coupled to one another. The processor 132 can include a microprocessor, a field-programmable gate array, and/or other suitable logic devices. The memory 134 can include volatile and/or non-volatile media (e.g., ROM; RAM, NVRAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-7). The input/output component 136 can include a network interface card or other suitable types of input/output devices configured to accept input from and provide output to an operator and/or an automated software controller (not shown).

The memory 134 of the first and second remote servers 106a and 106b can include instructions executable by the corresponding processors 132 to cause the individual remote servers 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage a host 141 and one or more virtual machines 144 (or containers) organized into tenant sites 142. For example, as shown in FIG. 2, the first server 106a can provide a first hypervisor 140a that manages first and second tenant sites 142a and 142b, respectively, for the same or different tenants or users 101 (FIG. 1). The second server 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first server 106a and the second server 106b can both host the tenant site 142a and 142a' for a first user 101a (FIG. 1). The first server 106a and the second server 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include one or more virtual networks 146 that interconnect the tenant sites 142a and 142b across multiple remote servers 106. For example, a first virtual network 142a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different remote servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

As shown in FIG. 2, the hypervisor 140 and/or the host 141 can assign one or more of the non-volatile memories 138 to be accessed by a virtual machine 144 via a PCIe bus. For example, the first server 106a can assign a non-volatile memory 138 to the virtual machine 144'. The second server 106b can assign another non-volatile memory 138 to the virtual machine 144". As alluded to above, the servers 106 can utilize one or more of the virtual machines 144 to facilitate efficient container migration from the local devices 103 (FIG. 1) and vice versa, as described in more detail below with reference to FIGS. 3A-4B.

Figure 3A:
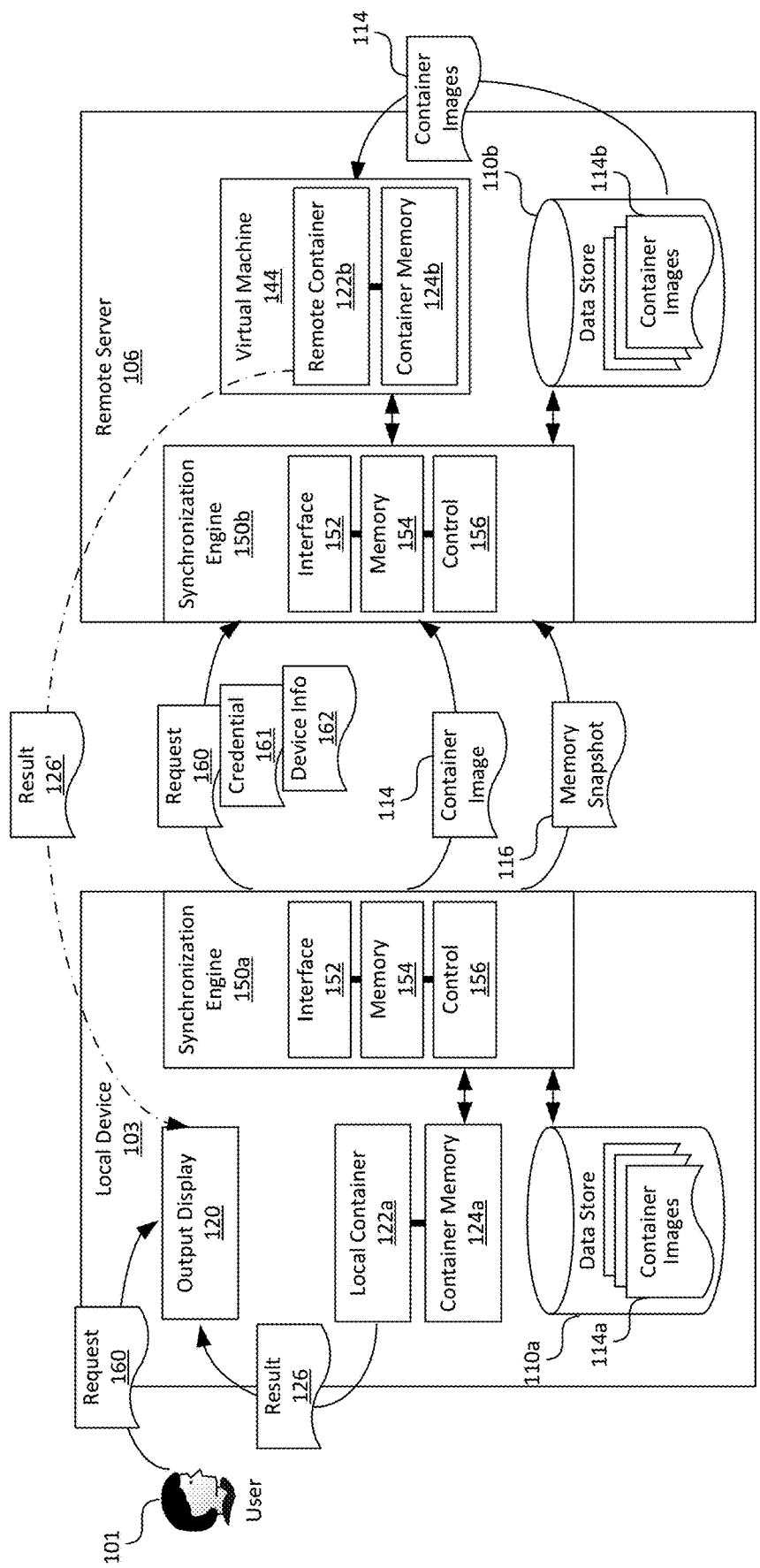
FIGS. 3A-3C are schematic diagrams illustrating certain hardware/software components of a server in FIGS. 1 and 2 during container migration in accordance with embodiments of the disclosed technology.
Figure 3B:
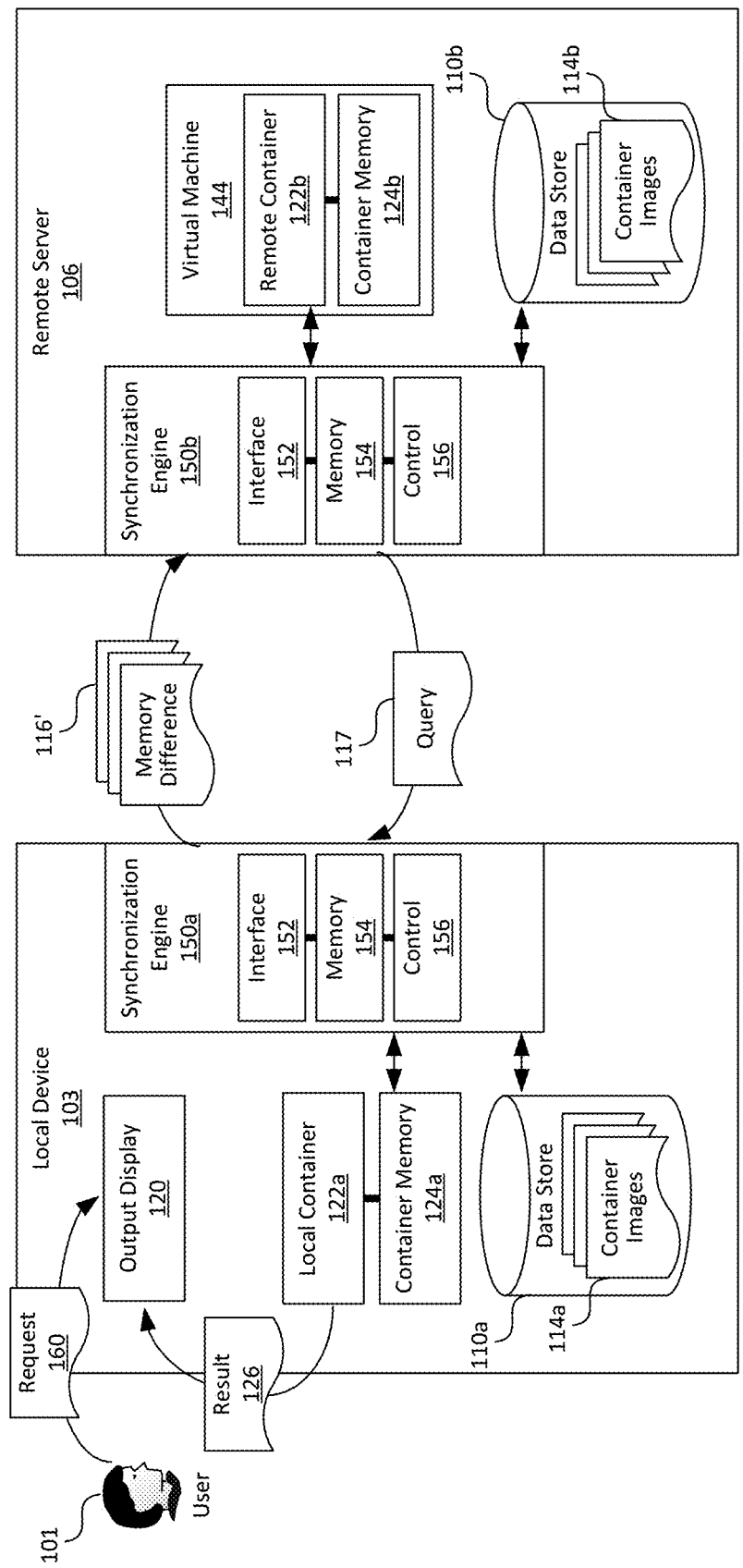
Figure 3C:
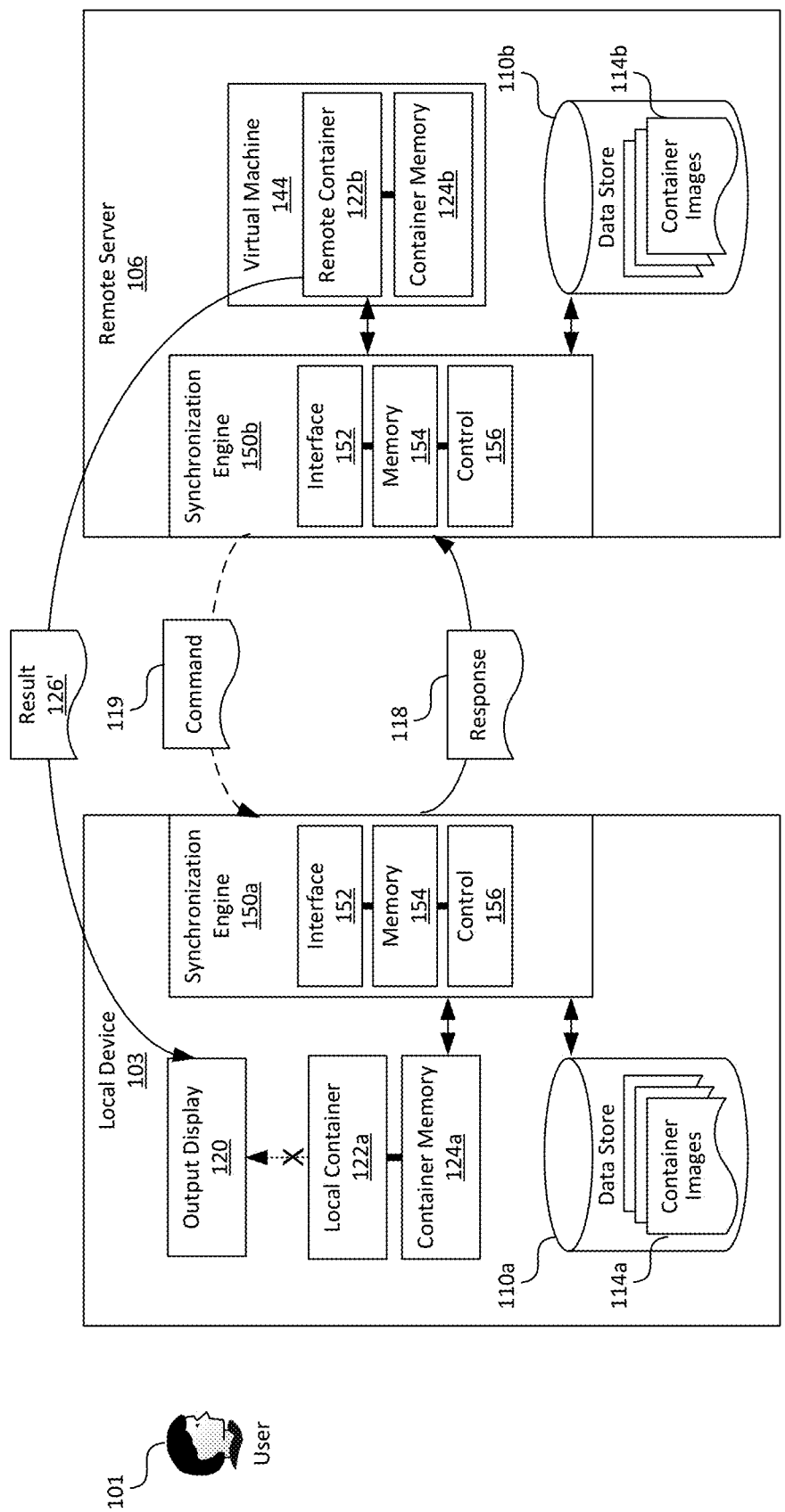

FIGS. 3A-3C are block diagrams illustrating certain hardware/software components of a local device 103 and a remote server 106 during certain operational stages migrating a local container 122a from the local device 103 to the remote server 106 in accordance with embodiments of the disclosed technology. Though the operations are described in the context of migrating the local container 122a (as a source container) from the local device 103 as a source device to be instantiated as the remote container 122b (as a destination container) on the remote server 106 as the destination device, in certain implementations, at least some operations described herein are equally applicable to migrating the remote container 122b from the remote server 106 as a source device to the local device 103 as a destination device. In addition, even though the migration process is described below as being triggered by a request 160 from the user 101, in other implementations, the migration process can be initiated based on a current operating state of the local device 103. Example operating states can include a power level, a status of network connectivity, a processor usage, a level of system storage, security status, attestation status, or other suitable operating parameters.

In certain embodiments, the local device 103 can include a data store 110a containing one or more container images 114a and a processor (not shown) configured to execute suitable instructions of one or more of the container images 114a to provide the local container 122a, for instance, as a container runtime. As used herein, a "runtime" generally refers to a computing environment in which a piece of software runs (e.g. programs loaded into memory, instructions scheduled and executed with a processor). In other embodiments, the container images 114a can also be available from a remote, removable, or other suitable types of storage location. As shown in FIG. 3A, the local container 122a can also be allocated to and allowed to access a container memory 124a during execution of the local container 122a and/or one or more applications (not shown) in the local container 122a. As such, the container memory 124a can be configured to contain memory state of the local container 122a and/or one or more applications executing in the local container 122a. Though the local container 122a is shown in FIG. 3A as being hosted by the local device 103 directly, in some embodiments, the local device 103 can also execute suitable instructions to provide a virtual machine (not shown) to host the local container 122a.

In certain implementations, the local device 103 can also include an output display 120 configured to surface execution results 126 of the local container 122a to the user 101. In certain embodiments, the output display 120 can include a user interface element (e.g., a graphical user interface) surfaced on an output component (e.g., a LED screen) of the local device 103. In other embodiments, the output display 120 can include other suitable hardware/software components. Various protocols can be used to surface the result 126 on the output display 120. One suitable example protocol is Remote Desktop Protocol (RDP). In some embodiments, the protocol simply reconnects the remote container 122b to the output display 120. In other embodiments, the protocol and container migration can be integrated and orchestrated. A make before break or other similar types of technique may be applied to reduce the interruption to output display 120. In some embodiments, the user 101 may have a seamless experience when accessing output display 120 because the remote container 122b quickly instantiates remotely. In some embodiments, the user 101 may be notified of a failure or delay. In some embodiments in which the container migration is automatic, the user 101 may be notified of the change. In other implementations, the local device 103 may not include an output display 120, for instance, when the local device 103 is an embedded device. Instead, execution results from the local or remote container 122a and 122b can be used to actuate, transmit, or perform other suitable operations.

As shown in FIG. 3A, each of the local device 103 and the remote server 106 can also implement a synchronization engine 150 (shown as local and remote synchronization engines 150a and 150b, respectively) configured to facilitate container migration between the local device 103 and the remote server 106. The synchronization engine 150 can include an interface component 152, a memory component 154, and a control component 156 operatively coupled to one another. Even though the functionalities of various components of the synchronization engines 150 are described below in the context of migrating the local container 122a to the remote server 106, similar components of the synchronization engines 150a and 150b can have similar or the same functionalities when migrating a remote container 122b (shown in FIG. 3B) from the remote server 106 to the local device 103.

The interface components 152 of the synchronization engines 150 can be configured to communicate with each other via a suitable synchronization protocol and transport used to synchronize state between the local device 103 and the remote server 106. In certain embodiments, the individual interface components 152 can include a network interface card and corresponding software drivers. In other embodiments, the interface components 152 can include other suitable hardware/software components.

The interface component 152 can also be configured to transmit or relay a migration request 160 between the local device 103 and the remote server 106. For instance, as shown in FIG. 3A, upon receiving the request 160 from the user 101, the interface component 152 at the local device 103 can relay the request 160 to the remote server 106 along with, for example, credentials 161 for validating the user 101, device information 162 containing version, build, or other suitable parameters of the local device 103, and/or other suitable information. In other examples, the credentials 161 and/or the device information 162 can be pre-distributed or shared between the local device 103 and the remote server 106. In some embodiments, the device information 162 may contain a configuration template that contains certain aspects of the container configuration. In some embodiments, the device information 162 may contain one or more of an operating system version, a list of applied patches, driver version information, firmware version information, and/or other suitable information. In some embodiments, the request 160 may be automatically generated by a component (e.g., a container engine) on local device 103 instead of being initiated by the user 101.

Upon receiving the request 160, the remote server 106 can be configured to validate the user 101 based on the received or pre-distributed credentials 161. Upon validating the user 101, in one example, the control component 156 at the remote server 106 can be configured to instantiate a virtual machine 144 based on the received or pre-distributed device information 162. As such, the virtual machine 144 can be provided with an operating system kernel that is compatible with or the same as that of the local device 103.

The memory components 154 at the local device 103 can be configured to synchronize both an image and memory state for a migrated container. In one embodiment, as shown in FIG. 3A, upon receiving the request 160 to migrate the local container 122a to the remote server 106, the memory component 154 can be configured to generate a container image 114 of the local container 122a. The container image 114 can include digital data representing a filesystem, one or more applications executing in the local container, and configuration parameters thereof. Example techniques for generating the container image 114 can include executing a "commit" or "file management" command for Docker. Upon receiving a user request 160, the memory component 154 can also be configured to capture, from the container memory 124a, a memory snapshot 116 containing a memory state of the local container 122a and the one or more applications executing in the local container 122a. In other embodiments, the container image 114 can be pre-distributed to the remote server 106. As such, instead of receiving the container image 114 from the local device 103, the remote server 106 can be configured to retrieve a copy of the container image 114 from the data store 110b based on, for instance, the device information 162.

In certain implementations, execution of the local container 122a can then be paused subsequent to capturing the memory snapshot 116 while the memory component 154 can be configured to transmit the generated image and the captured memory snapshot 116 to the remote server 106. Upon receiving the container image 114 and the memory snapshot 116, the remote server 106 can instantiate a remote container 122b based on the container image 114 and the memory snapshot 116. Subsequently, the remote server 106 can continue executing the one or more applications in the remote container 122b and provide a result 126' of such execution to the output display 120 at the local device 103.

In certain implementations, the local container 122a has shared memory with the host (e.g., the local device 103 or a virtual machine thereon). When shared memory is mapped into the local container 122a, the memory snapshot 116 proceeds and the memory map information can also be captured and shared with the remote server 106 via the device information 162 or a similar mechanism. When the remote container 122b on the remote server 106 is instantiated, the same memory map can be created as a part of this instantiation.

In another implementation, execution of the local container 122a can continue after capturing the memory snapshot 116, as shown in FIG. 3B. Subsequent to transmitting the initial memory snapshot 116 as shown in FIG. 3A, the memory component 154 can be configured to capture additional memory snapshots and generate one or more memory difference 116' based on the subsequently captured memory snapshots relative to a prior one. The memory component 154 can then be configured to transmit the memory difference 116' to the remote server 106 continuously, periodically, or in other suitable manners. Upon receiving the memory difference 116', the control component 156 at the remote server 106 can be configured to apply the received memory difference to the instantiated remote container 122b. The control component 156 can then transmit, via the interface component 152, a query 117 to the local device 103 inquiring whether any additional memory difference 116' is still present on the local device 103.

As shown in FIG. 3C, upon receiving a response 118 from the local device 103 indicating that no more memory difference 116' is present on the local device 103, the remote server 106 can continue executing the one or more applications in the remote container 122b and provide the execution result 126' to the output display 120 of the local device 103. In certain embodiments, before the output display 120 is switched from the local container 122a to the remote container 122b, the remote server 106 can also optionally transmit a pause command 119 to the local device 103. In response to the pause command 119, the control component 156 at the local device 103 can be configured to pause the execution of the local container 122a and switch the output display 120 to the remote container 122b. In other embodiments, switching the output display 120 can be performed without pausing the local container 122a.

Figure 4A:
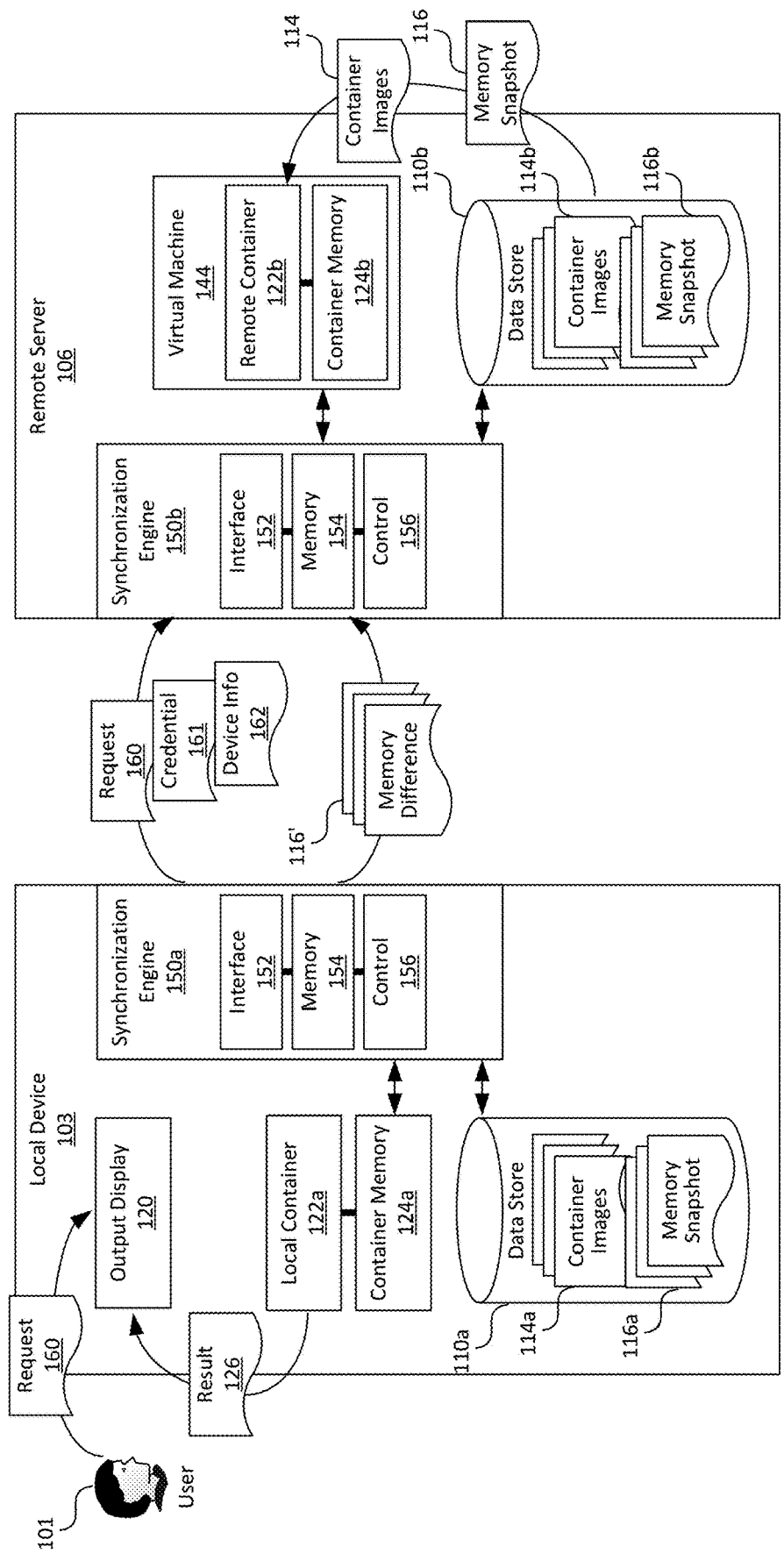
FIGS. 4A and 4B are schematic diagrams illustrating certain hardware/software components of a server in FIGS. 1 and 2 during container migration in accordance with additional embodiments of the disclosed technology.
Figure 4B:
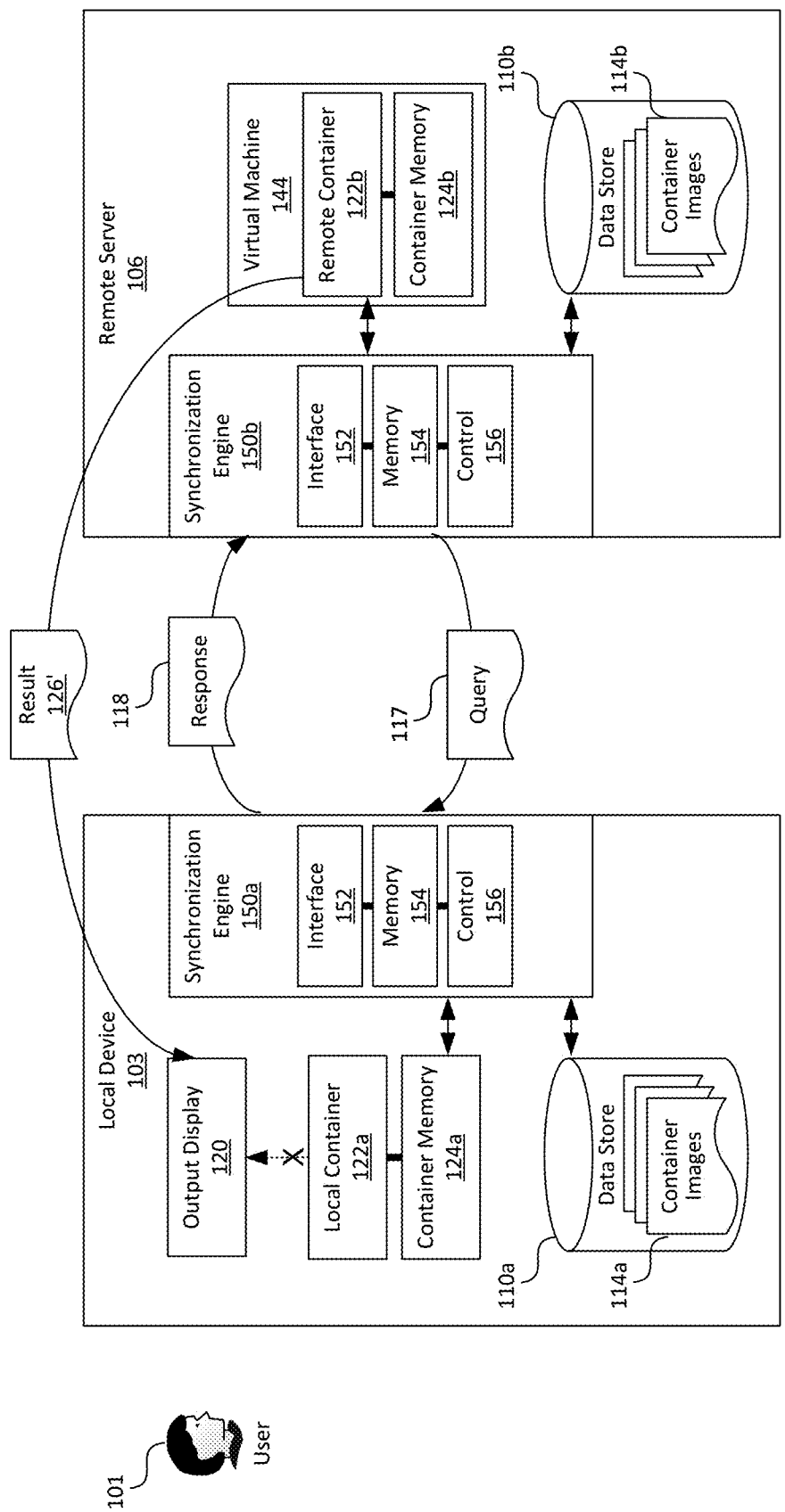

Even though the migration process described above with reference to FIGS. 3A-3C involves capturing a memory snapshot of the local container 122a and instantiating the remote container 122b based thereon, in other embodiments, the memory snapshot 114 can also be pre-distributed between the local device 103 and the remote server 106. For example, as shown in FIG. 4A, both container images 114 and memory snapshots 116 corresponding to the container images 114 can be pre-distributed between the local device 103 and the remote server 106. In one example, the pre-distributed memory snapshot 116 can include a captured memory state of the local or remote container 122 during a boot up operation. In other examples, the pre-distributed memory snapshot 116 can include a captured memory state of the local or remote container 122 during other suitable execution points.

As such, during the migration process, the remote server 106 can be configured to retrieve both the container image 114 and an initial memory snapshot 116 from the data store 110b. The memory component 154 at the local device 103 can then be configured to generate and transmit to the remote server 106 one or more memory differences 116' to be applied to the instantiated remote container 122b, as described above with reference to FIG. 3B. Subsequently, the remote server 106 can be configured to transmit the query 117 to the local device 103, and switch the output display 120 to the remote container 122b upon receiving the response 118, as described above with reference to FIG. 3C.

During the migration process described above with reference to FIGS. 3A-4B, handles to local operating system resources for the local container 122a can be tracked. A "handle" generally refers to an abstract reference to a computing resource. For example, handles can be used when an application references blocks of memory or objects managed by an operating system or a database. An example handle can be an opaque identifier or a pointer that allows access to further information regarding the computing resource. In one embodiment, a handle table can be implemented on both the local device 103 and the remote server 106 to ensure handles of the local container are also opened on the remote server. This may be achieved by synchronizing the handle tables wholesale, or on a per-handle basis. In some implementations, the handle table may also be cached. For example, new handles on the remote server 106 may result in a cache miss and be remotely fetched from the local device 103 and migrated only as-needed.

Several embodiments of the disclosed technology can thus facilitate efficient switching between using local resources and using remote resources migration via containerization. By tracking the memory state of a migrated local container 122a (or a remote container 122b), the container 122 can be migrated from the local device 103 to the remote server 116, or vice versa, in a seamless manner. As such, users 101 can readily switching between using local resources and using remote resources with little or no interruption.

Several embodiments of the disclosed technology can also implement embodiments described above to migrate containers running on a remote server 106 to a local device 103. For users who have multiple local devices 103 (e.g. a desktop computer, a laptop computer, a phone, etc.), attributes of such local devices 103 may be shared as a part of the device information 162, and thus enabling the synchronization engine 150b to target the appropriate local device 103. In one embodiment, user presence may be used to determine an interactive application scenario may be migrated to a laptop computer that the user is currently using. In another embodiment, compute resources may be used to determine a compute intensive application may be migrated to a desktop computer.

Figure 5:
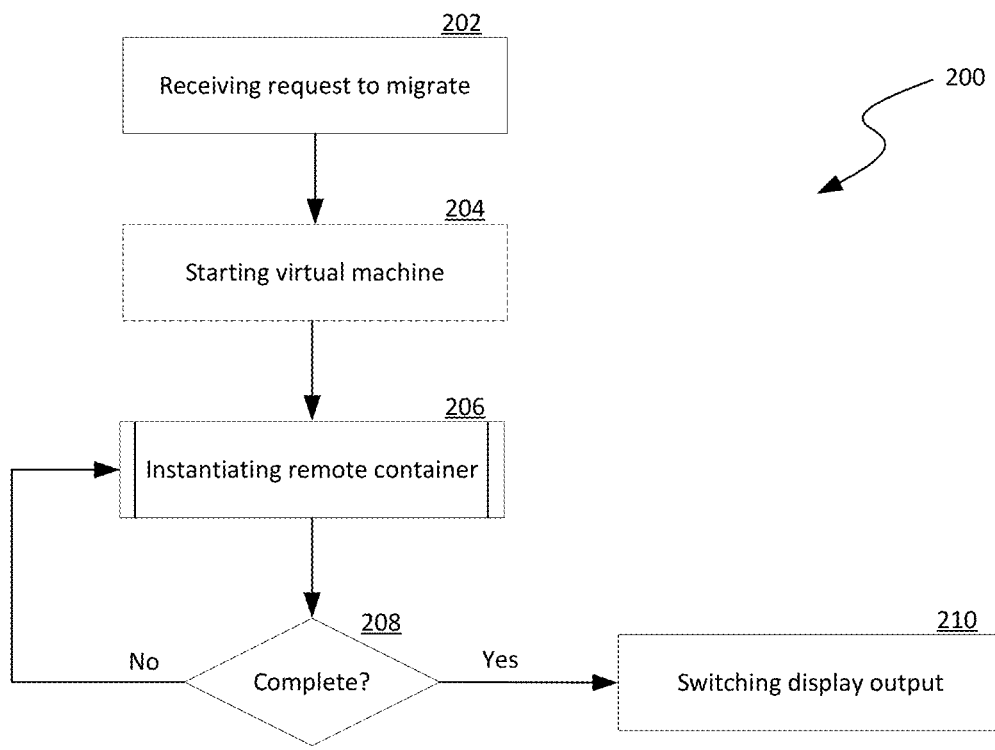
FIGS. 5-7 are flowcharts illustrating various processes of container migration in accordance with embodiments of the disclosed technology.

FIG. 5 is a flowchart illustrating a process 200 of container migration in accordance with embodiments of the disclosed technology. Even though the process 200 is described in relation to the distributed computing system 100 of FIGS. 1 and 2, in other embodiments, the process 200 can also be implemented in other suitable systems.

As shown in FIG. 5, the process 200 can include receiving a request to migrate a container from a source device to a destination device at stage 202. In one embodiment, the container can be migrated from a local device 103 (FIG. 1) to a remote server 106 (FIG. 1). In another embodiment, the container can be migrated from the remote server 106 to the local device 103. In a further embodiment, the container can be migrated from one remote server 106 to another in the computing facility 104 (FIG. 1).

In certain embodiments, the process 200 can then include an optional stage 204 in which a virtual machine or container is started on the destination device, as described above with reference to FIG. 3A. In some embodiments, operations at stage 204 may also include allocating additional system resources such as memory, devices, etc. Such just-in-time resource allocation may be determined by the device information 162 or other indicators. In other embodiments, the operation at stage 204 can be omitted such that the container is migrated directly to the destination device.

The process 200 can then include instantiating a remote container at stage 206. In certain embodiments, the remote container 206 can be instantiated based on a copy of captured current image and memory snapshot of the container on the source device. In other embodiments, at least one of the image or memory snapshot of the container can be pre-distributed between the source and the destination devices. Example operations of instantiating the remote container are described in more detail below with reference to FIGS. 6A and 6B. The process 200 can then include a decision stage 206 to determine whether instantiating the remote container is complete. In response to determining that instantiating the remote container is complete, the process 200 can include switching a display output on the source device to the remote container at stage 210, as described above with reference to FIG. 3C.

Figure 6A:
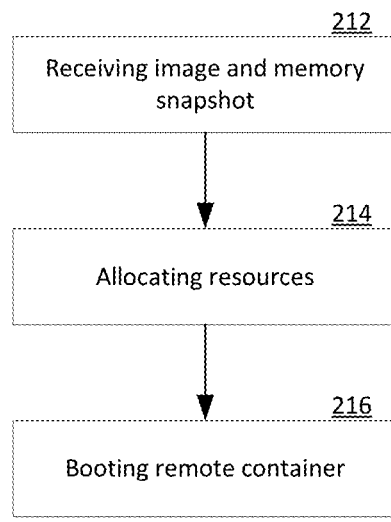

FIG. 6A is a flowchart illustrating example operations of instantiating the remote container. As shown in FIG. 6A, the operations can include receiving a copy of a captured image and memory snapshot of a container to be migrated at stage 212. The operations can then include allocating various resources (e.g., system or virtual memory) to the remote container at stage 214. The operations can then include booting the remote container using the received coy of the captured image and memory snapshot at stage 216.

Figure 6B:
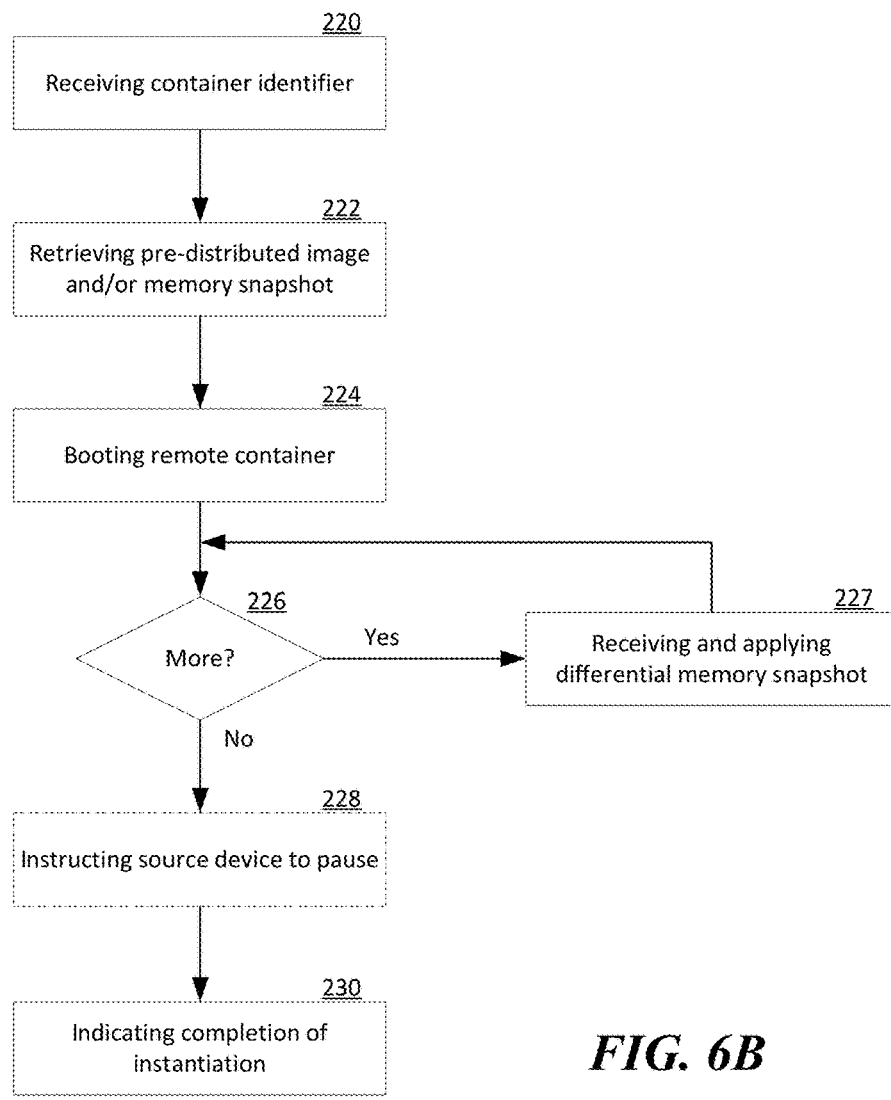

FIG. 6B is a flowchart illustrating additional example operations of instantiating the remote container. As shown in FIG. 6B, the operations can include receiving a container identifier of the container to be migrated at stage 220. Such a container identifier can include a serial number or other suitable types of identifier. The operations can then include retrieving at least one of pre-distributed image or memory snapshot of the container based on the container identifier at stage 222. The operations can then include booting the remote container 224 using the retrieved image and/or memory snapshot at stage 224.

The operations can then include a decision stage 226 to determine whether any differential memory snapshots of the container exist at the source device. In response to determining that additional differential memory snapshots of the container exist at the source device, the operations can proceed to receiving and applying the additional differential memory snapshots to the remote container at stage 227 before revert back to determining whether further differential memory snapshots of the container exist at the source device. In certain implementations, the operation at stage 227 can also include updating the pre-distributed image and/or memory snapshot of the container based on the additional differential memory snapshot. In response to determining that no differential memory snapshots of the container exist at the source device, the operations can proceed to an optional stage 228 of instructing the source device to pause execution of the container and then indicating that instantiation of the remote container is complete at stage 230.

Figure 7:
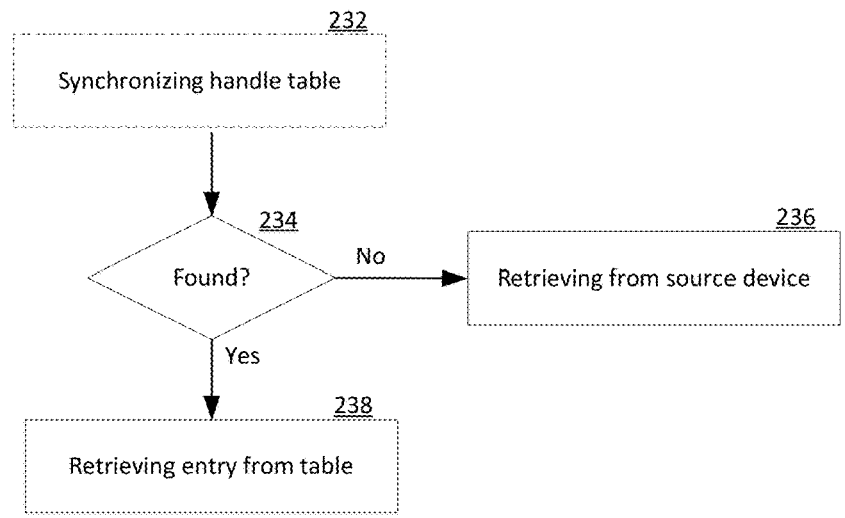

FIG. 7 is a flowchart illustrating example operations of synchronizing handles between a source device and a destination device during migration of a container from the source device to the destination device. As shown in FIG. 7, the operations can optionally include partially or completely synchronizing a handle table containing entries identifying various handles between the source and destination devices at stage 232. The operations can then include a decision stage 234 to determine whether a new handle corresponds to an entry in the synchronized handle table. In response to determining that the new handle does not correspond to an entry in the synchronized handle table, the operations can include retrieving information regarding the new handle from the source device at stage 236. In response to determining that the new handle does correspond to an entry in the synchronized handle table, the operations can include retrieving information regarding the new handle from the handle table at stage 238.

Figure 8:
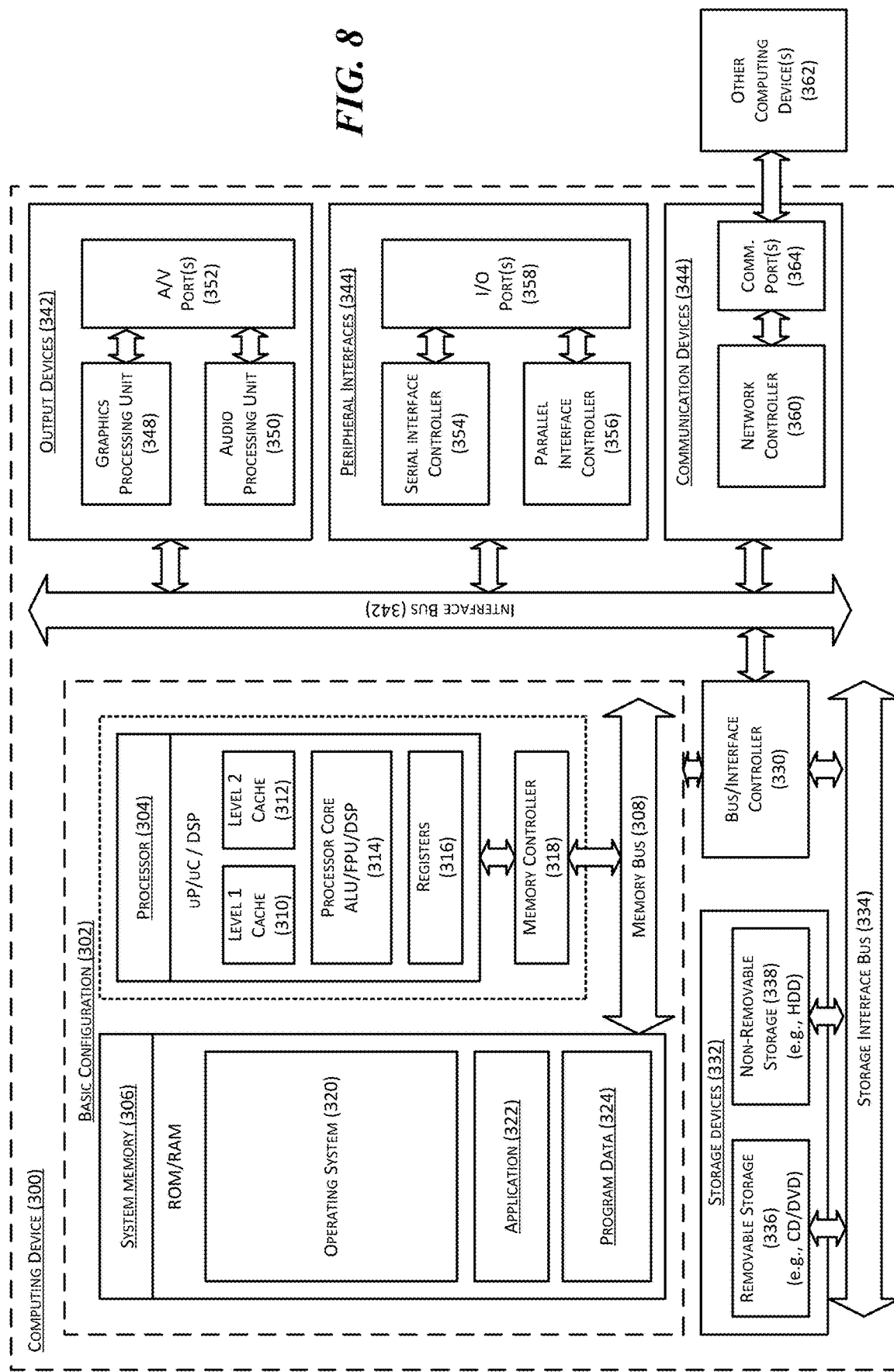
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the local devices 103 or the remote servers 106 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, NVRAM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other local devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed in a computing system having a source device interconnected to a destination device by a computer network, the method comprising:
   receiving, at the destination device, a request to migrate a source container currently executing on the source device to the destination device, the source container including a software package having a software application in a filesystem sufficiently complete for execution of the software application in an operating system by a processor of the source device to provide a display output of the software application; and
   in response to the received request from the source device, at the destination device,
      starting a virtual machine having an operating system that is compatible with that of the source device;
      instantiating, in the started virtual machine, a destination container using a copy of an image and a memory snapshot of the source container on the source device to execute a copy of the software application to produce a remote display output of the software application; and
      upon completion of instantiating the destination container at the destination device to execute the another copy of the software application, transmitting, via the computer network, the produced remote display output of the copy of the software application from the destination container to the source device to be surfaced on the source device in place of the display output from the source container.

2. The method of claim 1, further comprising:
   receiving, from the source device, data identifying a version of the operating system on the source device; and
   wherein starting the virtual machine includes:
      retrieving an image of the operating system from a network storage in the computing facility that is compatible with the version of the operating system on the source device identified in the received data; and
      processing, at the destination device, the retrieved image of the operating system to provide the virtual machine at the destination device.

3. The method of claim 1, further comprising:
   receiving, from the source device, a copy of the image and the memory snapshot from the source device; and
   wherein instantiating the destination container includes instantiating the destination container using the received copy of the image and the memory snapshot from the source device.

4. The method of claim 1, further comprising:
   receiving, from the source device, data representing an identifier of the source container; and
   wherein instantiating the destination container includes:
      retrieving a pre-distributed image of the source container from a network storage in the computing facility according to the data representing the identifier of the source container; and
      instantiating the destination container using the pre-distributed image of the source container on the destination device.

5. The method of claim 1, further comprising:
   receiving, from the source device, data representing an identifier of the source container; and
   wherein instantiating the destination container includes:
      retrieving a pre-distributed image and initial memory snapshot of the source container from a network storage in the computing facility according to the data representing the identifier of the source container; and
      instantiating the destination container using the pre-distributed image and initial memory snapshot of the source container on the destination device.

6. The method of claim 1 wherein:
   instantiating the destination container includes instantiating, on the destination device, the destination container using a pre-distributed image and initial memory snapshot of the source container in the computing facility; and
   the method further includes:
      receiving a differential memory snapshot from the source device, the differential memory snapshot representing a data difference between the initial memory snapshot and a current memory snapshot of the source container on the source device; and
      applying the received differential memory snapshot to the destination container.

7. The method of claim 1 wherein:
   instantiating the destination container includes instantiating, on the destination device, the destination container using a pre-distributed image and initial memory snapshot of the source container in the computing facility; and
   the method further includes:
      receiving a differential memory snapshot from the source device, the differential memory snapshot representing a data difference between the initial memory snapshot and a current memory snapshot of the source container on the source device;
      applying the received differential memory snapshot to the destination container; and
      transmitting, via the computer network, a command to the source device, the command instructing the source device to pause execution of the source container.

8. The method of claim 1 wherein:
   instantiating the destination container includes instantiating, on the destination device, the destination container using a pre-distributed image and initial memory snapshot of the source container in the computing facility; and
   the method further includes:
      receiving a differential memory snapshot from the source device, the differential memory snapshot representing a data differential between the initial memory snapshot and a current memory snapshot of the source container on the source device;
      applying the received differential memory snapshot to the instantiated destination container;
      upon applying the received differential memory snapshot, transmitting, via the computer network, a command to the source device, the command instructing the source device to pause execution of the source container; and wherein transmitting the remote display output includes transmitting the remote display output to the source device upon receiving data representing a confirmation that no additional differential memory snapshot of the source container is present on the source device.

9. The method of claim 1 wherein:

instantiating the destination container includes instantiating, on the destination device, the destination container using a pre-distributed image and initial memory snapshot of the source container in the computing facility; and the method further includes:
receiving multiple differential memory snapshots from the source device, the differential memory snapshots representing a data differential between successive memory snapshots of the source container on the source device;
applying the received multiple differential memory snapshots to the instantiated destination container in sequence; and
wherein transmitting the remote display output includes transmitting the remote display output to the source device upon receiving data representing a confirmation that no additional differential memory snapshot of the source container is present on the source device.

10. A destination device in a computing facility interconnected to a source device via a computer network, the destination device comprising:

a processor; and a memory operatively coupled to the processor, the memory containing instructions executable by the processor to cause the destination device to, upon receiving a request to migrate, to the destination device, a source container currently executing an application to produce a display output of the application surfaced on the source device to:
start a virtual machine on the destination device, the virtual machine having an operating system that is compatible with that of the source device;
instantiate, in the started virtual machine, a destination container using a copy of an image and a memory snapshot of the source container on the source device, the image including a software package having a copy of the application in a filesystem that is sufficiently complete for execution of the copy of the application in the operating system of the instantiated virtual machine on the destination device to generate a remote display output of the application; and
upon completion of instantiating the destination container on the destination device,
execute the copy of the application in the destination container to generate the remote display output of the application; and
transmit, via the computer network, the generated remote display output of the application to be surfaced on the source device in place of the display output produced by executing the application in the source container.

11. The destination device of claim 10 wherein the memory contains additional instructions executable by the processor to cause the destination device to:

receive, from the source device, a copy of the memory snapshot of the source container on the source device with the request; and wherein to instantiate the destination container includes to instantiate the destination container using the received copy of the memory snapshot with the request.

12. The destination device of claim 10 wherein the memory contains additional instructions executable by the processor to cause the destination device to:

receive, from the source device, data representing an identifier of the source container; and wherein to instantiate the destination container includes to:
retrieve a pre-distributed memory snapshot of the source container from a network storage in the computing facility according to the data representing the identifier of the source container; and
instantiate the destination container using the pre-distributed memory snapshot of the source container on the destination device.

13. The destination device of claim 10 wherein:

to instantiate the destination container includes to instantiate, on the destination device, the destination container using a pre-distributed initial memory snapshot of the source container in the computing facility; and the memory contains additional instructions executable by the processor to cause the destination device to:
receive a differential memory snapshot from the source device, the differential memory snapshot representing a data difference between the initial memory snapshot and a current memory snapshot of the source container on the source device; and
apply the received differential memory snapshot to the destination container.

14. The destination device of claim 10 wherein:

to instantiate the destination container includes to instantiate, on the destination device, the destination container using a pre-distributed initial memory snapshot of the source container in the computing facility; and the memory contains additional instructions executable by the processor to cause the destination device to:
receive a differential memory snapshot from the source device, the differential memory snapshot representing a data difference between the initial memory snapshot and a current memory snapshot of the source container on the source device;
apply the received differential memory snapshot to the destination container; and
upon applying the received differential memory snapshot transmit, via the computer network, a command to the source device, the command instructing the source device to pause execution of the source container on the source device.

15. The destination device of claim 10 wherein:

to instantiate the destination container includes to instantiate, on the destination device, the destination container using a pre-distributed initial memory snapshot of the source container in the computing facility; and the memory contains additional instructions executable by the processor to cause the destination device to:
receive a differential memory snapshot from the source device, the differential memory snapshot representing a data differential between the initial memory snapshot and a current memory snapshot of the source container on the source device;
apply the received differential memory snapshot to the instantiated destination container;

upon applying the received differential memory snapshot, transmit, via the computer network, a command to the source device, the command instructing the source device to pause execution of the source container on the source device; and transmit the remote display output includes to transmit the remote display output to the source device upon receiving data representing a confirmation that no additional differential memory snapshot of the source container is present on the source device.

16. A method performed in a computing system having a source device interconnected to a computing facility having multiple destination devices by a computer network, the method comprising:

receiving, at a destination device, a request to migrate, to the destination device, a source container currently executing an application to produce a local display output of the application surfaced on the source device, the source container including a software package having the application in a filesystem sufficiently complete for execution of the application in an operating system of the source device to provide the local display output of the application on the source device; and in response to the received request from the source device, starting a virtual machine on the destination device, the virtual machine having an operating system that is compatible with that of the source device;

synchronizing a list of handles utilized by the source container on the source device between the destination device and the source device;

instantiating, in the started virtual machine at the destination device, a destination container using a copy of an image, a memory snapshot, and the synchronized list of handles of the source container on the source device, the image including a software package having a copy of the application in a filesystem that is sufficiently complete for execution of the copy of the application in the operating system of the started virtual machine on the destination device to generate a remote display output of the application; and upon completion of instantiating the destination container, executing the copy of the application in the destination container to generate the remote display output of the application; and transmitting, via the computer network, a remote display output of the application to be surfaced on the source device in place of the local display output generated by executing the application in the source container.

17. The method of claim 16 wherein:
the list of handles are tracked in a data structure; and
synchronizing the list of handles includes synchronizing a copy of the table on the source device and another copy of the table on the destination device.

18. The method of claim 16 wherein:
the list of handles are tracked in a data structure;
synchronizing the list of handles includes synchronizing a copy of the table on the source device and another copy of the table on the destination device; and
the method further includes:
determining whether a handle corresponds to an entry in the synchronized table on the destination device; and
in response to determining that the handle corresponds to an entry in the synchronized table on the destination device, retrieving information of the handle from the entry of the table.

19. The method of claim 16 wherein:
the list of handles are tracked in a data structure;
synchronizing the list of handles includes synchronizing a copy of the table on the source device and another copy of the table on the destination device; and
the method further includes:
determining whether a handle corresponds to an entry in the synchronized table on the destination device; and
in response to determining that the handle does not correspond to any entry in the synchronized table on the destination device, retrieving information of the handle from the source device via the computer network.

20. The method of claim 16, further comprising:
receiving a differential memory snapshot from the source device, the differential memory snapshot representing a data difference between the memory snapshot and a current memory snapshot of the source container on the source device; and
applying the received differential memory snapshot to the destination container.

* * * * *